United States Patent
Millard et al.

(10) Patent No.: US 6,892,287 B1
(45) Date of Patent: May 10, 2005

(54) FRAME REASSEMBLY IN AN ATM NETWORK ANALYZER

(75) Inventors: Paul C. Millard, Eastleigh (GB); Kathryn E. Rickard, Romsey (GB); Christopher Bloxham, Chichester (GB)

(73) Assignee: Xyratex Technology Limited, Havant (GB)

( * ) Notice: Subject to any disclaimer, the term of this patent is extended or adjusted under 35 U.S.C. 154(b) by 222 days.

(21) Appl. No.: 10/209,490

(22) Filed: Jul. 31, 2002

Related U.S. Application Data

(60) Provisional application No. 60/383,011, filed on May 24, 2002.

(51) Int. Cl.[7] .............................................. G06F 12/00
(52) U.S. Cl. ...................... 711/158; 711/147; 711/170; 709/213; 710/52; 710/74; 710/310
(58) Field of Search ........................... 709/213; 710/52, 710/74, 310; 711/147, 154, 170

(56) References Cited

U.S. PATENT DOCUMENTS

| | | | |
|---|---|---|---|
| 5,303,302 A | 4/1994 | Burrows | ........................ 380/49 |
| 5,870,394 A | 2/1999 | Oprea | ........................ 370/392 |
| 6,088,355 A | 7/2000 | Mills | ........................ 370/392 |
| 6,714,989 B1 * | 3/2004 | Mizutani et al. | ............ 709/250 |
| 2002/0041592 A1 * | 4/2002 | Van Der Zee et al. | ....... 370/389 |
| 2002/0067695 A1 * | 6/2002 | Skarpness et al. | ........ 370/230.1 |

* cited by examiner

*Primary Examiner*—Donald Sparks
*Assistant Examiner*—Christian P. Chace
(74) *Attorney, Agent, or Firm*—Cohen, Pontani, Lieberman & Pavane

(57) ABSTRACT

A method and system for partial reassembly of data frames reconstructed from data cells received from a network data stream includes partially reassembling the header cells and the last cell of each frame and passing the remainder of data frame cells to a capture buffer in an unassembled state. Since the partially reassembled data frames include only a subset of each frame, they can be processed at the full line-rate of the network data stream without causing an overflow. The cells in the partially reassembled frames are only those cells required for functions that must be performed at the full line rate.

54 Claims, 14 Drawing Sheets

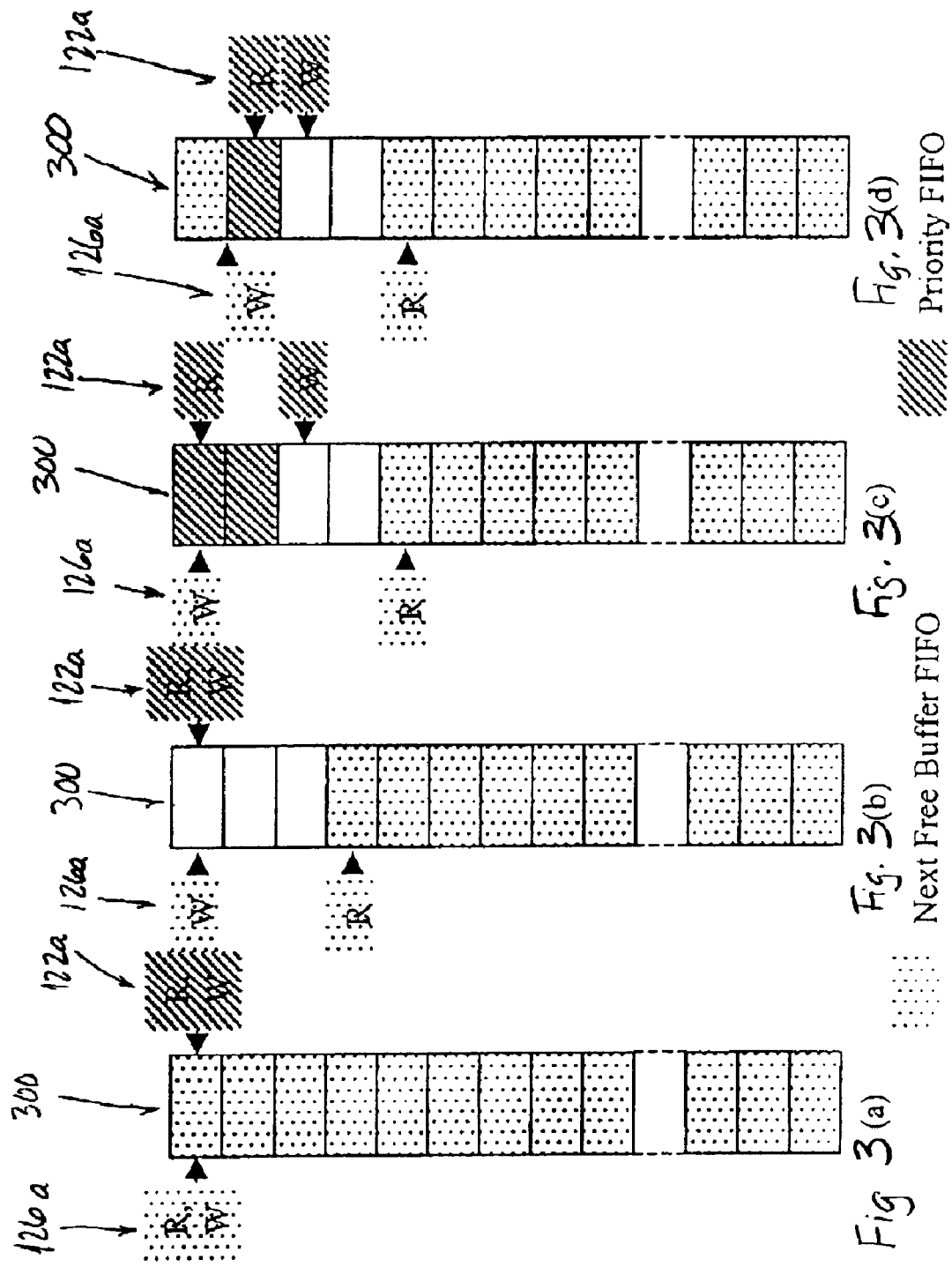

Fig. 4a Partial Reassembly Buffer

Fig. 4b Current Frame Pointer Table

FRAME REASSEMBLY IN AN ATM NETWORK ANALYZER

RELATED APPLICATION

The present application claims the benefit of the filing date of co pending provisional application no. 60/383,011, filed on May 24, 2002, the entire contents of which are incorporated herein by reference.

BACKGROUND OF THE INVENTION

1. Field of the Invention

The present invention relates to a process of reassembling interleaved data packets in an ATM Architecture and reassembly control hardware therefor.

2. Description of the Related Art

Asynchronous Transfer Mode (ATM) is a communication architecture in which information is transported in small, fixed-length units or cells of 53 bytes. Frames or packets of information, which may be as long as 128 KB, are split into multiple cell units for transport. The transmission facilities of an ATM network are shared between many users such that cells belonging to many users are interleaved. The exchange of a message or "connection" between two nodes of the ATM network is identified by an address pair known as the Virtual Path Identifier (VPI) and Virtual Channel Identifier (VCI).

Test systems that analyze ATM networks, i.e., network analyzers, may be required to analyze up to 4096 (4 K) or more simultaneous connections and must be able to capture and display reassembled frames to perform the required analysis. The frames captured by the network analyzer are stored in a capture buffer in ascending timestamp order; the timestamp for a frame is the timestamp for the last byte of the last cell of the frame. The network analyzer may additionally be required to capture and display the cells in link order, as for example to allow examination of cell loss on poor networks. Furthermore, the network analyzer may also be required to perform frame payload filtering in which each frame received from the link is compared against a template or filter criteria and discarded if it fails to match the template. This frame payload filtering ensures that the capture buffer of the network analyzer contains only useful data i.e., data that is required for the analysis. In the frame payload filter, the template or filter criterion is compared with the frame header (which is encapsulated in the first few cells of the frame). The start of each frame must accordingly be delayed until the cells containing the frame header are received. However, unless the buffer is partitioned on a connection basis, it is difficult to introduce the necessary delay because the cells are physically scattered among other cells when they arrive.

The network analyzer may perform a statistical analysis which uses protocol information, frame length, and any errors in the re-assembled frame to collect Remote Monitoring (RMON) statistics. This statistical information is contained in the first few cells and the last cell of each frame. The network analyzer may also perform an expert analysis process that examines real time data to diagnose problems. The information used by the expert analysis process is contained in the same cells of the frame as the RMON statistics information.

The real time, and hence performance constrained, requirements of an ATM network analyzer are frame filtering, RMON, and expert analysis. Data must be stored in the capture buffer of the network analyzer at full line-rate, but is only required to be viewed post-capture. Since the viewing process is only required after capture of the information, it is less performance critical.

In the ATM realm, the Segmentation And Reassembly layer (SAR) for segmenting and reassembling frame cells is part of the ATM Adaptation Layer (AAL), which is the uppermost layer in the ATM architecture. This AAL provides the interface between ATM user network software and the ATM network itself The SAR layer of a source endpoint of the ATM network segments frames into the 48-byte payload field of cells (a 53-byte cell including a 5-byte header and the 48-byte payload) and the SAR layer of a destination endpoint of the ATM network receives the cells and reconstructs frames by reassembling the individual cell payloads. The Network Interlace Controller (NIC) cards of the source and destination end points, i.e., computers, connected to the network implement the frame reassembly function using a variety of methods.

In prior art reassembly processes, a number of bottlenecks prevent the host computer from receiving the captured data at the maximum rate that the network can support. One of these bottlenecks is the Direct Memory Access (DMA) process between the NIC card and the computer. This connection is typically made over a Peripheral Component Interconnect (PCI) bus which has an upper bandwidth limit of 133 Mbps (but typically lower in practice). The link rate supported by network analyzers is 622 Mbps at an Optical Carrier 12 (OC12) link and 2488 Mbps at an Optical Carrier 48 (OC48) link. The network is intended to be shared between many endpoints. Therefore, this difference between the bandwidth of the PCI bus at one endpoint and the network is not a problem. Ideally, the reassembly process is not the bottleneck for an endpoint, but the reassembly process typically reassembles frames for only one endpoint, and thus is not expected to reassemble all frames for all connections on a link simultaneously, i.e., at the full-line rate. Accordingly, the endpoint will discard frames if the incoming data exceeds its processing capacity.

In contrast to a typical endpoint, a network analyzer must be capable of capturing and filtering thousands of simultaneous connections at full line-rate. For example, 4K or more simultaneous frames may be multiplexed randomly onto a typical OC12 link. For the network analyzer to work properly, the reassembly process must not constitute a bottleneck in this capture and filtering process. That is, frames may be dropped because they do not meet a filter criterion, but not because the reassembly process is overloaded. The reliability of a network analyzer to capture the data or interest without regard to the loading of the network is paramount. RMON and expert analysis may use a sampled data approach which is more forgiving in that it does not require every frame; but the reassembly process must be fast enough to avoid development of a bottleneck under such circumstances.

In one prior art method for reassembling individual cells in frames, one cell at a time is accepted at a NIC card and passed on to a memory of the host system. The NIC card in these systems maintains a table of pointers to the frame buffers in system memory. Each cell is directed to an appropriate area of memory in accordance with the VPI/VCI of the cell for reassembly of the packet. This method is not, however, appropriate for a Network Analyzer which must provide packet reassembly at the line-rate.

A second prior art method, disclosed by U.S. Pat. No. 5,303,302, uses a temporary storage in a NIC card and reassembles frames in local memory, at least in part, before sending them to the host system memory. Since the lengths of the frames are variable and not known until the entire frame has been received, this method teaches that the buffer may be allocated in blocks with each block is large enough to hold a number of reassembled cells and pointers for backward and forward linking of other blocks within that connection. The control logic for this arrangement controls free buffer space, buffer overflow, maintenance of the linked list pointers, and transfers to the host system memory of fully reassembled or partially reassembled frames.

In a third known method disclosed, for example, in U.S. Pat. No. 5,870,394 and U.S. Pat. No. 6,088,355, cells are stored in cell slots in a temporary buffer as they are received in unassembled order. In this method, separate linked lists are created for each connection as the cells are received and stored ii the buffer. Reassembly occurs just prior to transfer of the frame to the host memory using the linked list to sequentially retrieve all cells of the frame. In this method, the controlling logic must similarly control the free buffer space, buffer overflow, maintenance of the linked lists, and transfer to the host system memory of reassembled or portions of reassembled frames.

The first above-described prior art reassembly method is ineffective for full line-rate reassembly at the bit rates required for an ATM network analyzer. While the second and third above-described methods improve the performance of the reassembly over the first method, both require full reassembly of frames. Certain traffic flows will cause buffer overflows and prevent transfer to the host of some frames that should be transferred, thereby limiting system performance. Furthermore, there is no definitive size for the temporary buffers of these prior art methods that will prevent such an overflow, as the frames are variable in size. An attempt to limit an overflow requires a very large buffer to support frames of as long as 128 KB for the 4K or more connections that may be interleaved. To cope with a worst case traffic scenario in which frames for each one of the 4K or more open connections are interleaved, a minimum of 512 MB (4K connections*128 KB per connection) is required. The temporary storage can only be zeroed or emptied when a reassembly of a packet or frame has completed. Depending on the outgoinig bandwidth from the reassembly process and the buffer format used, the time required to empty the buffer may necessitate the availability of additional storage.

The requirement of the second above-described prior art reassembly method that the frames be reassembled in a temporary storage can be excessively wasteful of storage for short frames. Furthermore, the link lists required by this method may requires a large amount of data and processing time.

In the third above-described prior art method, the size of the link lists used to reassemble the data of each connection increases as the buffer increases in size. Since the linked lists are needed on a per connection basis and because of the random nature of the traffic pattern, each link list must index each cell in the buffer. As a result of this substantial memory requirement the link list may need to be stored in an external RAM rather than the memory of the controlling Application Specific Integrated Circuit (ASIC), thereby reducing performance. Furthermore, multiple accesses are required to maintain and access each list during each cell period, introducing performance problems at the OC12 link rates.

SUMMARY OF THE INVENTION

It is accordingly the desideration of the present invention to provide a viable low-cost reassembly control hardware system and process for reassembling data frames from cells received from a network and which may be used with a network analyzer for monitoring a network at high link rates.

The present invention is based on a realization that the functions which must be performed at full line-rate (i.e., filtering, RMON, and expert analysis) require the reassembly of only the header cells, i.e., the first three cells, and the last cells of each frame, and that full frame reassembly is necessary only for post-capture frame viewing. Accordingly, the present invention includes partial reassembly of the header cells and the last cell of each frame, and passing of the remainder of cells of each frame to a capture buffer in an unassembled state. This reduces the amount of temporary storage required for the reassembly buffer and also defines a finite size for a reassembly buffer in which no frames need be dropped (since the storage requirements for four cells of each frame is fixed for a defined number of connections).

The present invention provides a partial reassembly control hardware system and a method for reassembling and marking the first three cells and the last cell of a frame on the fly, and transferring these four cells as a block to an output data flow without overflow and at full link-rate for a large number of connections associated with a network analyzer. The partially reassembled frames are output in the last timestamp order, as required. Cells other than the first three and last cells of each frame are passed directly to the output of the partial reassembly block in the order that they are received at full link-rate. In accordance with the invention, payload filtering may be performed on the header cells, i.e., the first three cells, of a frame to avoid storing invalid cells in the capture buffer. RMON and expert analysis can be performed on filtered or unfiltered, partial reassembled frame segments. The frames in the capture buffer may be fully reassembled post-capture, and recovery of the link cell order in the capture buffer may be performed post-capture.

Before carrying out the partial reassembly, the receiving logic of the ATM analyzer system of the invention receives all incoming cell and identifies the connection in the network to which the incoming cell belongs using the VPI/VCI identifiers in the cell header. The VPI/VCI identifiers may be translated to an index in a table of supported connections delineated the "connection index". Cells from unsupported connections are discarded. The receiving logic also identifies the header cells of a frame and the last cell of each frame by decoding the cell header information that contains a last cell indicator. To store additional data, each cell may be expanded to 64-bytes; the additional bytes (above 53-bytes) occupied by the cell are used for descriptor information generated by the logic in the data flow of the reassembly control hardware. The cell number within the frame is one such field which may be stored in the descriptor, and the connection index may be another. The descriptor field is advantageously employed to simplify downstream logic and prevent duplicate decoding logic.

In a first embodiment of the present invention, the partial reassembly buffer is implemented using synchronous dynamic random access memory (SDRAM). In a second embodiment of the invention, the partial reassembly buffer comprises a dual-ported static random access memory (SRAM) and a first-in-first-out memory is used with the partial reassembly buffer to minimize buffering requirements.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

In the drawings, wherein like reference characters denote similar elements throughout the several views:

FIGS. 3a–3d is a schematic diagram of a shared random access memory (RAM) for Next Free Address and Priority first-in-first-out (FIFO) memory buffers;

FIG. 4a is a schematic diagram of a partial reassembly buffer of the system of FIG. 1;

FIG. 4b is a schematic diagram of a current frame pointer table of the system of FIG. 1;

DETAILED DESCRIPTION OF THE PRESENTLY PREFERRED EMBODIMENTS

Figure 1:
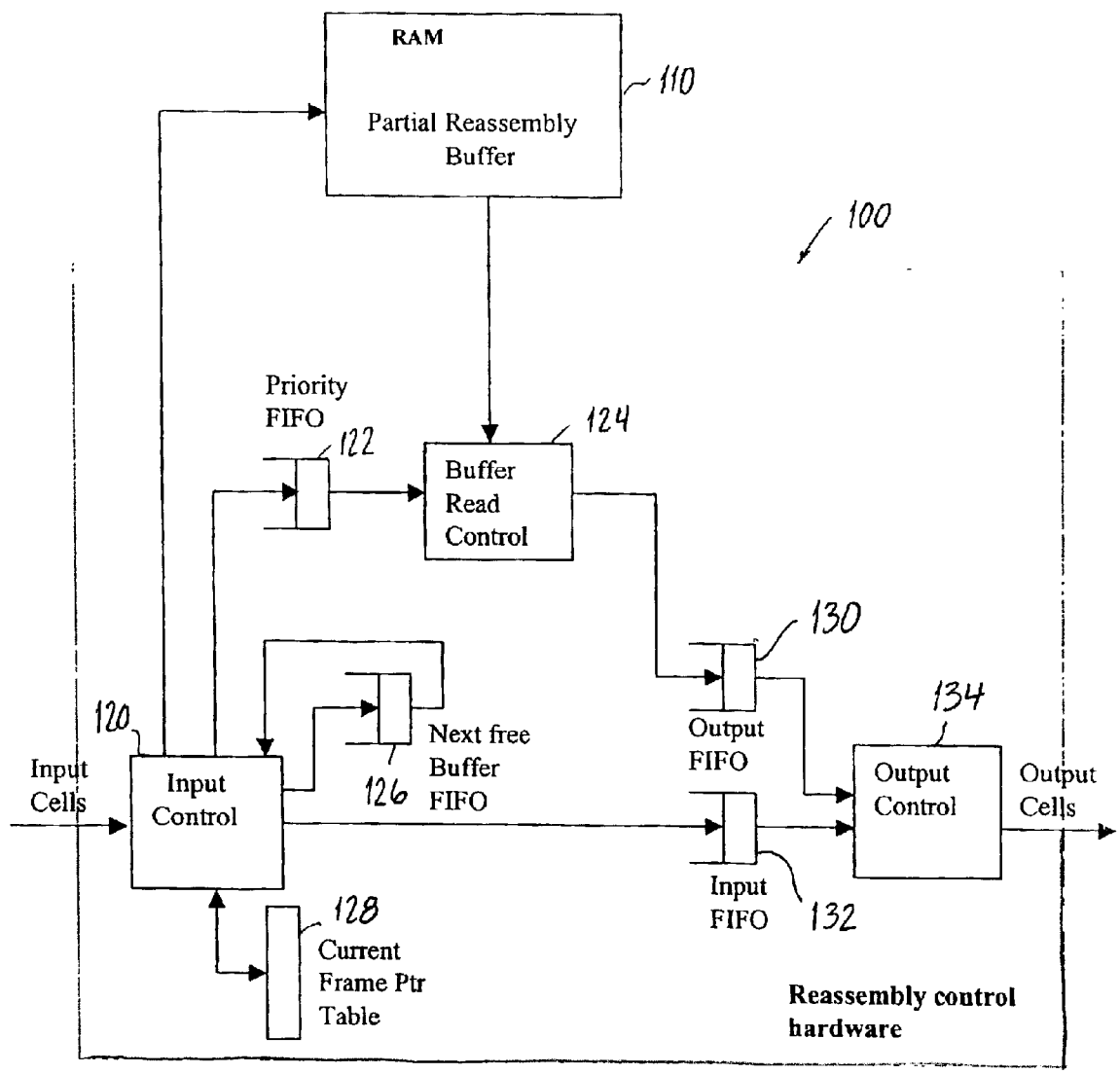
FIG. 1 is a block diagram of a partial reassembly control hardware system according to a first embodiment of the present invention.
Figure 14:
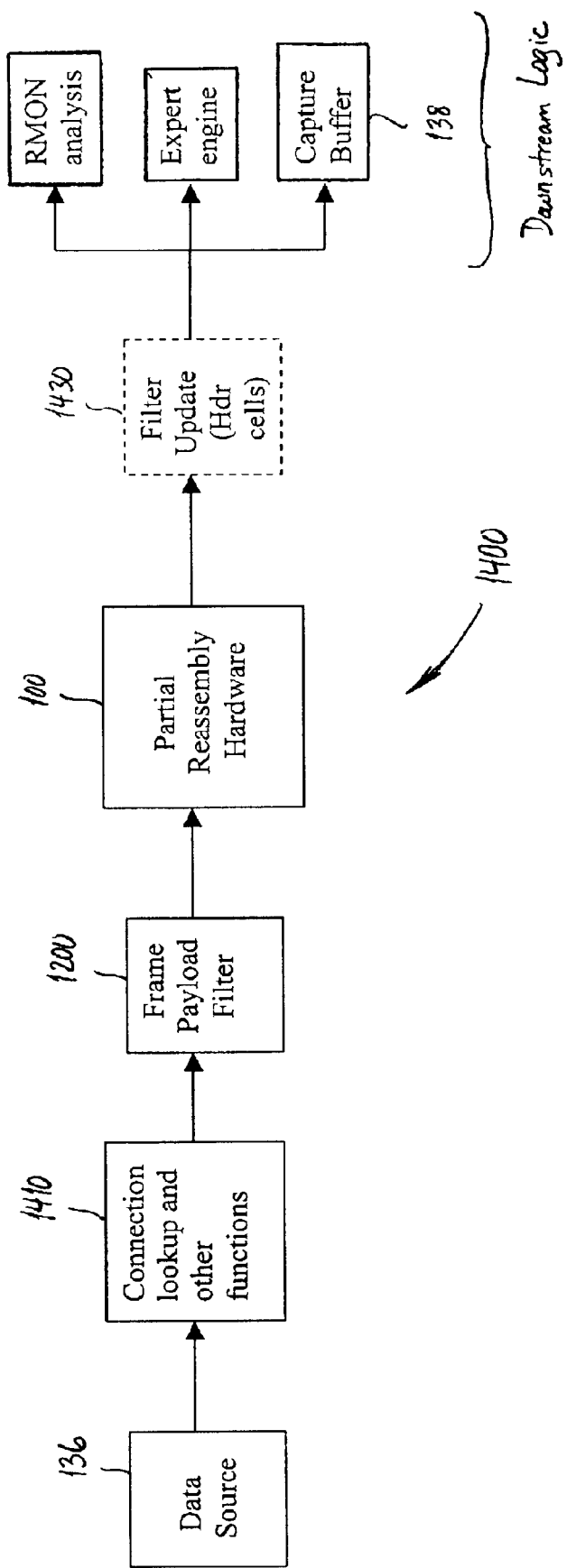
FIG. 14 is a schematic diagram of an ATM analyzer system including a reassembly control hardware system according to the present invention.

FIG. 1 depicts the main functional blocks of a reassembly control hardware system 100 For partially reassembling data frames in accordance with the present invention and FIG. 14 depicts the reassembly control hardware system 100 implemented in an ATM analyzer system 1400. The description as presented herein specifically relates, by way of illustration, to analysis in an ATM network in which data flames are segmented for transport into 53-byte cells. The invention is nevertheless applicable to the reassembly of any data frames that are split into smaller units.

Cells of data frames are initially received from a data source 136 at a connection lookup 1410 which identifies the connection in the network to which the incoming cell belongs, for example, using the Virtual Path Identifier (VPI) and Virtual Channel Identifier (VCI) in the cell header. The data source may, for example, include a data stream received in real-time from or within a network, each cell being associated with one of a plurality of connections concurrently supported by the network. The VPI/VCI identifiers may be translated to an index in a table of supported connection delineated the "connection index. Cells from unsupported connections are discarded. Cells that are not discarded are transmitted to a frame payload filter 1200 which is described in more detail below. The cells are then passed to the reassembly control hardware system 100, the later cells of each frame being tagged with the frame payload filter result. The header cells are updated in a filter update 1430 and the cells are then transmitted in parallel to various downstream logic including RMON analysis, an expert engine, and the capture buffer.

Referring now to FIG. 1, cells which are not discarded by the connection lookup 1410 are initially received at an input controller 120 of the reassembly control hardware system 100. A partial reassembly buffer 110 includes a random access memory (RAM) controlled by an application specific integrated circuit (ASIC) or field-programmable gate array (FPGA) which provides temporary storage for the first three cells and the last cell of a frame for each of the connections supported by the network—in which can be as many as 4096 (4K) connections in the implementation and embodiment described herein, although the present invention is readily scalable to accommodate many more concurrent connections. Each 53-byte cell is stored in the partial reassembly buffer with an associated descriptor. The cell and descriptor together require 64-bytes of storage in the illustrated embodiment of FIG. 1, but the descriptor may otherwise vary in size as a function of the particular application in which it is used. The descriptor comprises information generated by input controller 120, including, by way of example, the cell number within the frame and the connection index. The descriptor field is employed to simplify the downstream logic and prevent duplicative decoding logic.

The minimum size of the partial reassembly buffer 110 is the result of the multiplication of the bytes per cell*the number of cells per frame*the number of connections in the currently-described embodiment, the partial reassembly buffer is 64*4*4K=1 MB, which is considerably less than the 512 MB required by fill frame reassembly methods and systems of the prior art.

To avoid the need for externally stored link lists and to ensure performance at the full link-rate, partial reassembly buffer 10 is allocated in blocks or frame buffers of 4 cells each. The frame buffers are allocated as the first cells of each frame are received, and each allocation is released as transfer of the partially reassembled frame from the partial reassembly buffer 110 commences Because emptying of the buffer is not instantaneous, the buffer may hold more than one frame per connection at any given time. To accommodate the worst case traffic scenario in which the last cells of each frame on each connection arrive sequentially, followed by a sequence of single cell frames, the number of frame buffers must be increased from 4K to 12K, so that total of a 3 MB of storage in partial reassembly buffer 110 is required to ensure that the buffer will not overflow under such worst case conditions (since four single cell frames can be received in the time that one four cell frame buffer is transferred from the partial reassembly buffer, the storage requirement is three times the number of connections supported.

Partial reassembly buffer 110 requires simultaneous input (fill) and output (emptying) data flow capabilities and may therefore be implemented using dual ported SRAM, thus allowing a simplified interface design and a clock rate equivalent to the incoming bandwidth. For example, an incoming data rate of 2.5 Gbps would require a dual ported SRAM with a data bus width of 64 bits to be clocked at 37.5 MHz. As a more cost effective alternative, partial reassembly buffer 110 may alternatively he implemented using SDRAM, which because it is single ported, will require a doubling of the clock rate and an additional increase to allow for the overhead related to interleaving the random access of cells. These requirements may be met using a standard PC100 SDRAM with a 64 bit wide interface.

Figure 2:
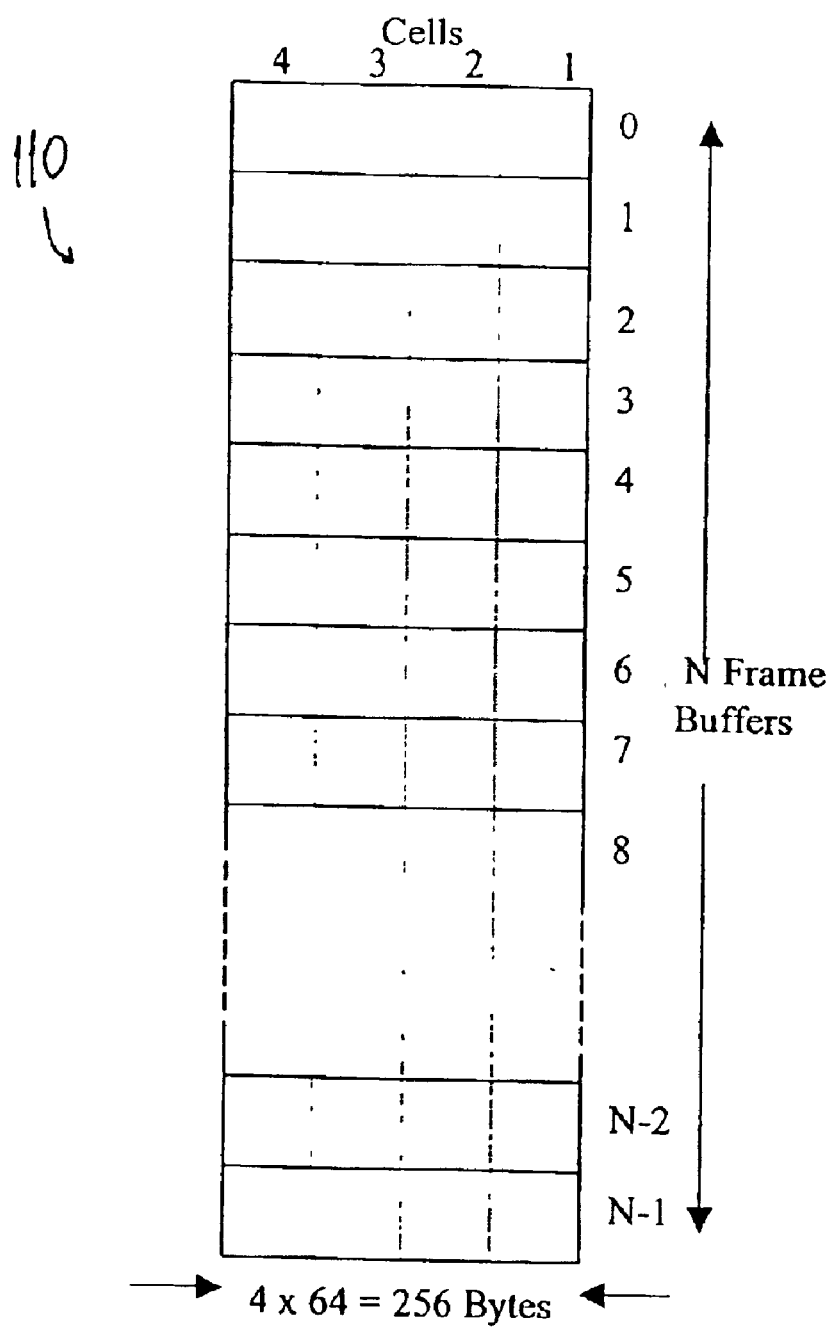
FIG. 2 is a schematic diagram of the logical format of a partial reassembly bufferof the system of FIG. 1.

FIG. 2 depicts the logical format of partial reassembly buffer 110. The actual physical mapping depends on the width of the RAM used by the partial reassembly buffer. The first, second, third, and last cells of a frame are stored at the frame buffer positions 1, 2, 3, and 4, respectively. For short frames, one or more of the later slots will remain empty.

With continued reference to FIG. 1, if the cell received at the input controller is not is a first, second, third, or last cell of a frame, it bypasses the partial reassembly buffer and is transferred to an input FIFO memory 132 (which is further described below). When the first cell of a frame is received, a next free buffer first-in-first-out FIFO memory 126 connected to input controller 120 is employed to indicate which frame buffers of partial reassembly buffer 110 are unused and available for new frames. A FIFO memory, such as next free buffer FIFO memory 126, is a memory buffer arranged so that data written to the FIFO is sequentially read out in the order that it was received. That is, the first piece of data written to the FIFO is the first piece of data read out from the FIFO. FIFO memories are commercially available as units which may be inserted into circuits or devices. While the present invention may be implemented using commercially available FIFOs, the free buffer FIFO memory 126 and other FIFOs (with one exception described below) are intended to be an integral part of the internal design of the reassembly ASIC or FPGA.

Since the cells received at input controller 120 are randomly ordered or interleaved, the unused frame buffers in partial reassembly buffer 110 will not be contiguous. The next free buffer FIFO memory 126 is a synchronous FIFO that is clocked at the link rate of the network analyzer and holds pointers to free frame buffers in partial reassembly buffer 110. It is equal in depth to the number of frame buffers, i.e., 12 K deep, and must be 14 bits wide, thus requiring a capacity of 168K bits, and may be implemented using an on-chip RAM.

When the system of FIG. 1 is reset, the next free buffer FIFO memory 126 is initialized by filling it with a pointer for each of the plural frame buffers in partial reassembly buffer 110. Input controller 120 reads a pointer from next free buffer FIFO memory 126 when the first cell of a frame is received.

When the second, third, or last cell of a frame is received, input controller 120 must determine the frame buffer to which the cell belongs so that the cell will be stored in the correct location in partial reassembly buffer 110 with the corresponding first cell. A current frame pointer table 128 connected to input controller 120 provides this information. Since there can be only one current frame on each connection at any one time, the current frame pointer table 128 requires a depth equal to the number of connection –4K in the current example. Moreover, in as much as the partial reassembly buffer contains 12K frame buffers, the width of the current frame pointer table 128 requires 14 bits. A total of 56K bits are accordingly required and may be implemented using an on-chip RAM.

Once partially reassembled, the frames must be read from partial reassembly buffer 110 in an efficient manner to prevent a buffer overflow. Because a number of frames may be completed by successively received cells, those frames in condition for transfer must be recorded. This recordation may also be used to ensure that the partially reassembled frames are transferred in the order in which their last cells were received and thereby allow the network monitor to process and capture the frames in the last-received cell order. A priority FIFO memory 122 may be used to perform this recordation function. Priority FIFO memory 122 is a synchronous FIFO of sufficient depth to store the full 12K frame buffer pointers in the worst case traffic scenario. When the last cell of a frame is stored in partial reassembly buffer 110, input controller 120 stores the frame buffer pointer in priority FIFO memory 122. A buffer read controller 124, which controls transfer of the partially reassembled frames to an output FIFO 130, reads priority FIFO 122 to determine the next partially reassembled frame to be transferred. Buffer read controller 124 is described in additional detail below.

It is generally contemplated that each of next free buffer FIFO memory 126 and priority FIFO memory 122 comprise its own dedicated memory. However, an alternative embodiment of the present invention anticipates their use of a shared RAM. The number of pointers in priority FIFO memory 122 is a subset of the used frame buffers of partial reassembly buffer 110 (i.e., those frame buffers including at least one cell of a frame), and next free buffer FIFO memory 126 contains pointers to the unused frame buffers of partial reassembly buffer 110. Accordingly, the sum of entries in each of next free buffer FIFO memory 126 and priority FIFO memory 122 is always less than or equal to—i.e., no greater than—the total number of frame buffers in the partial reassembly buffer. Thus, even if the RAM is not fully dual-ported, there is sufficient bandwidth for next free buffer FIFO memory 126 and priority FIFO memory 122 to share read/write access of a single shared RAM.

FIGS. 3a–3d show the shared use of a RAM 300 and the next free buffer FIFO read/write pointers 126a and priority FIFO read/write pointers 122a. FIG. 3a depicts the status of RAM 300 at initialization of the system 100. Here the next free buffer FIFO memory is full, i.e., all frame buffers are unused, and the priority FIFO memory is empty. The read/write pointers 122a, 126a for both are set at the first RAM 300 entry. FIG. 3b shows the shared RAM 300 after the first cells of frames on three connections have been received. The first three entries of the next free buffer FIFO memory have been read and are removed therefrom; these entries now point to used frame buffers. FIG. 3c shows the shared RAM 300 after last cells are received on two of the connections and pointers to these frame buffers are inserted in the priority FIFO memory. FIG. 3d shows the shared RAM 300 after the first completed frame is transferred from partial reassembly buffer 110, thereby freeing up its frame buffer. The priority FIFO read pointer 122a and next free buffer FIFO write pointer 126a are updated simultaneously to indicate that the first entry is again unused—the actual RAM 300 does not need modifying as the old content of the priority FIFO is now the new content of the next free buffer FIFO.

Figure 4C:
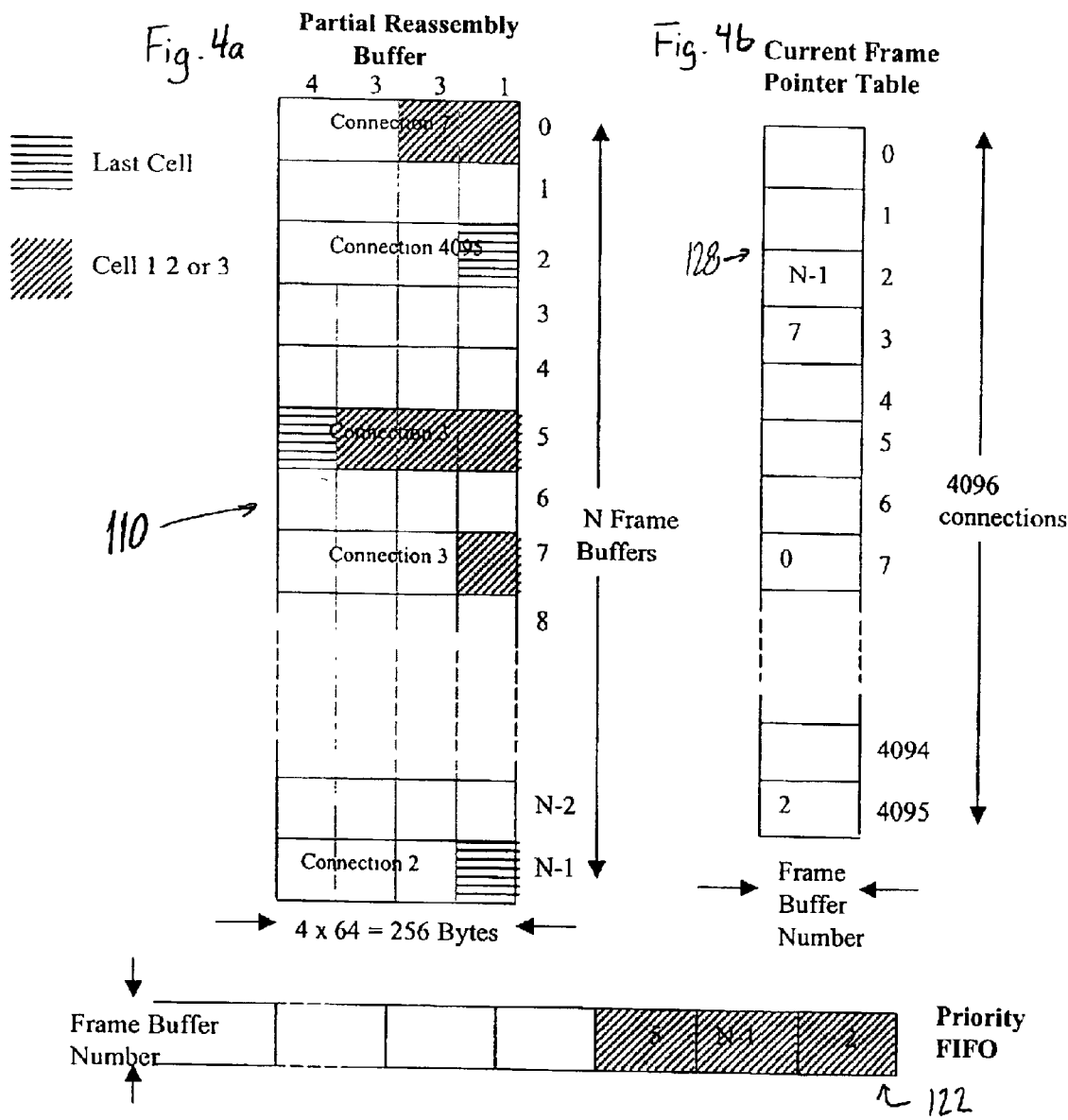
FIG. 4c is a schematic diagram of a priority FIFO of the system of FIG. 1.

FIGS. 4a–4c show the partial reassembly buffer 110, the current frame pointer table 128, and the priority FIFO memory 122 at a particular instant in time at which the first two cells of a frame belonging to connection 7 are in frame buffer 0 of the partial reassembly buffer, a single cell frame belonging to connection 4095 is in frame buffer 2 of the partial reassembly buffer, of the first three and last cells of a complete frame belonging to connection 3 are in frame buffer 5 and a first cell of the next frame of connection 3 is at frame buffer 7, and a single cell frame belonging to connection 2 is received in frame buffer N-1. The last cell in frame buffer 2 was received before the last cell in frame buffer N-1, which was received before the last cell in frame buffer 5.

Figure 5:
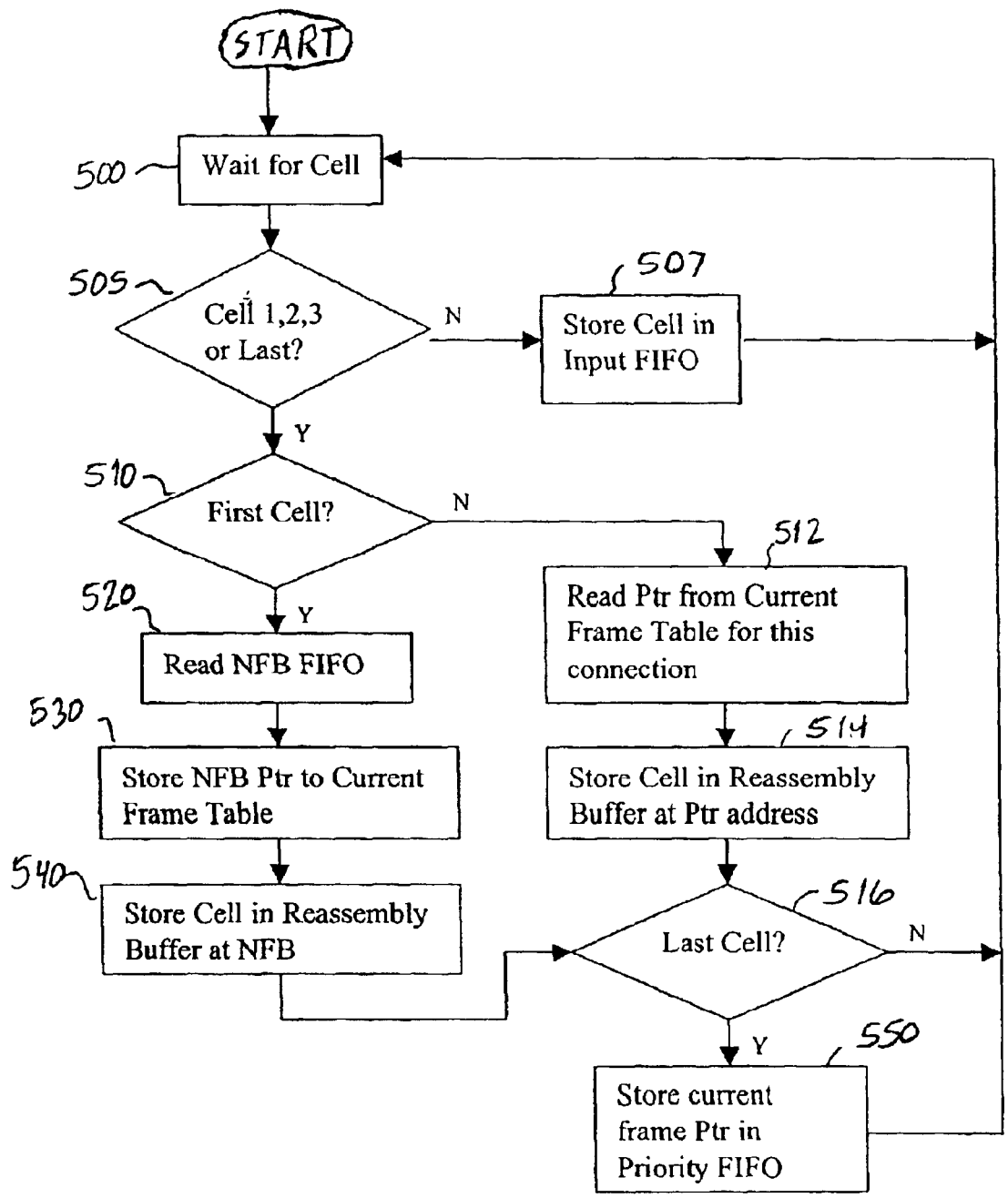
FIG. 5 is a flow diagram depicting a reassembly method using the system of FIG. 1.

Input controller 120 operates as shown in the flow chart of FIG. 5. When a cell is input to the reassembly control hardware 100 (step 500) the input controller determines whether the cell is a first, second, third or last cell of a frame (step 505). If it is not, then the cell is stored in the input FIFO memory 132 (see FIG. 1). Input FIFO memory 132 is a synchronous FIFO of sufficient size to store four cells, thereby providing a Sufficient buffer to prevent an overflow when there is a pause in reading from the FIFO. If it is determined that the input cell is a first, second, third, or last cell, then input controller 120 determines whether the cell is a first cell (step 510). If so, a pointer to a new frame buffer is obtained from next free buffer FIFO memory 126 (step 520). The pointer obtained in step 520 is then stored in the pointer to current frame table 128 (step 530) and the cell is stored in partial reassembly buffer 110 (step 540) at the frame buffer location indicated by the pointer obtained at step 520.

If the cell is determined at step 510 to not be a first cell, then the pointer to the frame buffer location for the frame of that cell is obtained from current frame pointer table 128 (step 512) and the cell is stored in the partial reassembly buffer at the location identified by the so-obtained current frame pointer (step 514).

Following steps 514 and 540, input controller 120 determines whether the cell is the last cell of the frame (step 516). If it is not, the process returns to step 500 and awaits receipt of a further cell. If it is determined in step 516 that the cell is the last cell for its frame, then the current frame pointer is stored in the priority FIFO memory 122 (step 550), thereby indicating that the partially reassembled frame is ready to be transferred to the from the partial reassembly buffer to the downstream logic. Following step 550, the input controller returns to step 500 to wait for the next incoming cell to be processed.

Figure 6:
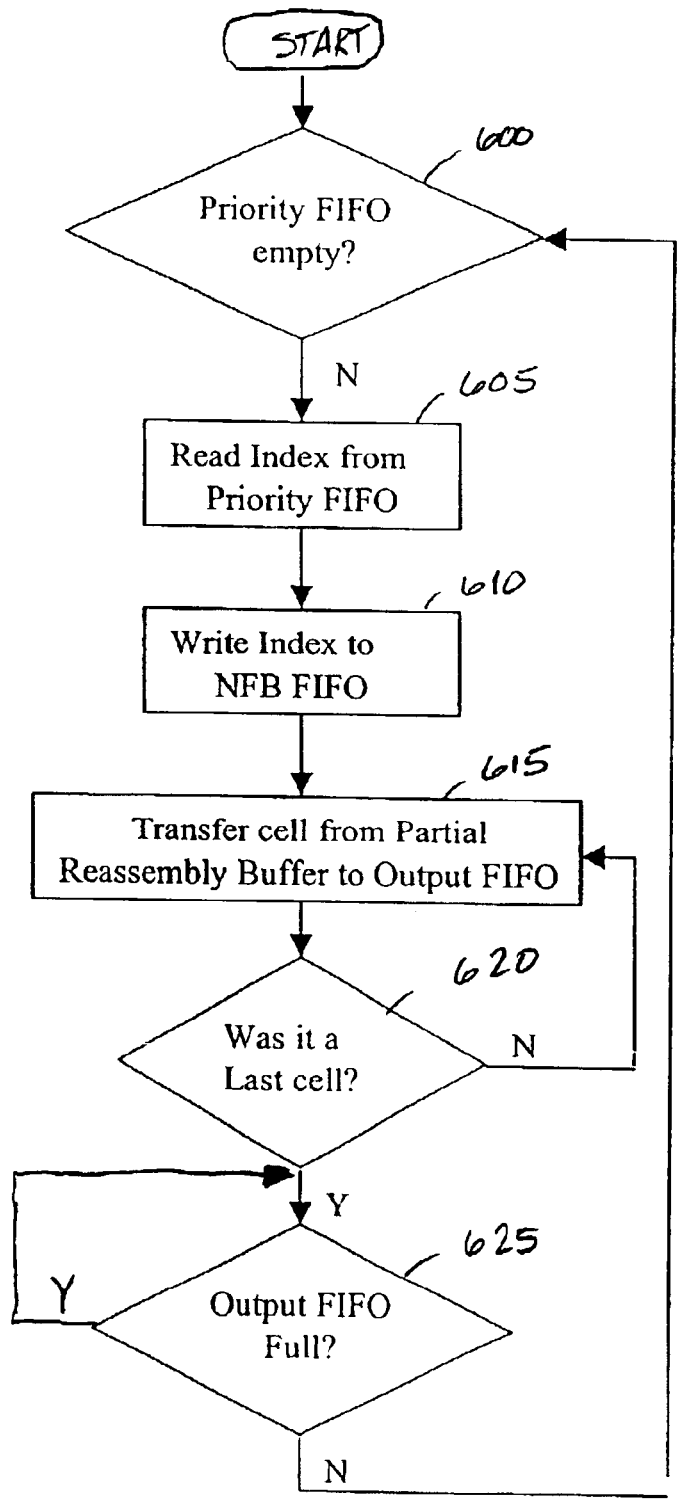
FIG. 6 is a flow diagram for buffer read control using the system of FIG. 1.

The buffer read controller 124 operates as shown in the flow chart of FIG. 6. At step 600, the buffer read controller 124 monitors the priority FIFO memory 122. If the priority FIFO is not empty, buffer read controller 124 reads the frame buffer pointer of the next partially reassembled frame from priority FIFO memory 122 (step 605). Since this buffer is about to become free, the pointer is written into the next free buffer FIFO memory 126 (step 610)—this step may be simplified in the shared FIFO scheme described above with reference to FIGS. 3a–3d. Pipelininig of the pointers in next free buffer FIFO memory 126 ensures that the first cell of this frame in partial reassembly buffer 110 will not be overwritten with data before it is transferred therefrom. The cells of the partially reassembled frame are transferred in sequence from partial reassembly buffer 110 and stored in output FIFO memory 130 (step 615). Each cell transferred from the partial reassembly buffer 110 is checked at step 620 to determine whether it is the last cell of the partially reassembled frame. Output FIFO memory 130 is a synchronous FIFO large enough to hold foul cells, and it and the input FIFO memory 132 are connected to an output controller 134 which empties output FIFO 130 and input FIFO 132 to the capture buffer using a process discussed below. If Output controller 134 has not yet started to empty Output FIFO memory 130 and is now full, buffer read controller 124 pauses before repeating the process.

Figure 7:
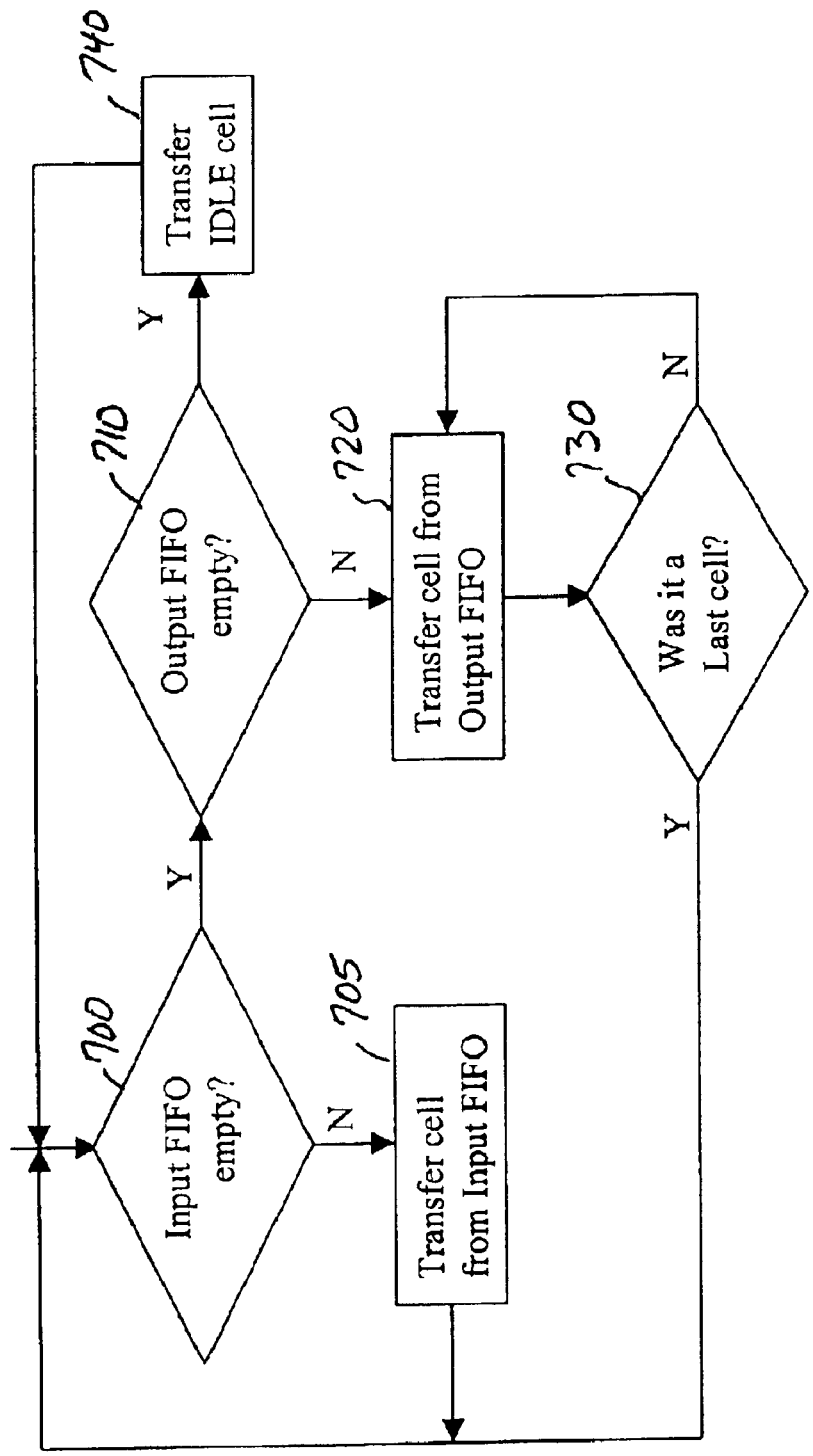
FIG. 7 is a flow diagram showing the output control logic using the system of FIG. 1.

As previously noted, the output controller 134 monitors the state of output FIFO memory 130 and input FIFO memory 132 and empties the cells therein to the downstream logic (see FIG. 14). Cells in input FIFO memory 132 have priority over cells in the output FIFO memory 130; this ensures that the middle cells of a frame are always transferred to the capture buffer before the first three cells and the last cell of the frame. The procedure for emptying output FIFO memory 130 and input FIFO memory 132 is shown in FIG. 7.

Thus, at step 700 the output controller determines whether input FIFO memory 132 is empty. If it is not, the cells stored therein are transferred from input FIFO 132 to the downstream logic (step 705). If, on the other hand, input FIFO memory 132 is empty, then the output controller determines whether output FIFO memory 130 is empty (step 710). If not, then the cells contained therein are transferred from output FIFO memory 130 to the downstream logic at step 720. If the transferred cell is determined to be the last cell of a frame (step 730) then step 700 is repeated. If, however, it is determined at step 730 that the transferred cell is not the last cell, then step 720 is repeated and another cell is transferred from output FIFO memory 130 to the capture buffer. Accordingly, step 720 and 730 may iterate up to foul times.

If output FIFO memory 130 is found to be empty at step 710, an IDLE cell is transferred and step 700 is repeated. Since the incoming and outgoing bandwidth is balanced, the IDLE cell insertion function is used while the traffic is such that partial reassembly buffer 110 is filling and partially reassembled frames contained therein are not yet ready for transfer. This effectively moves the position of the IDLE cell slots in the output traffic.

Figure 8:
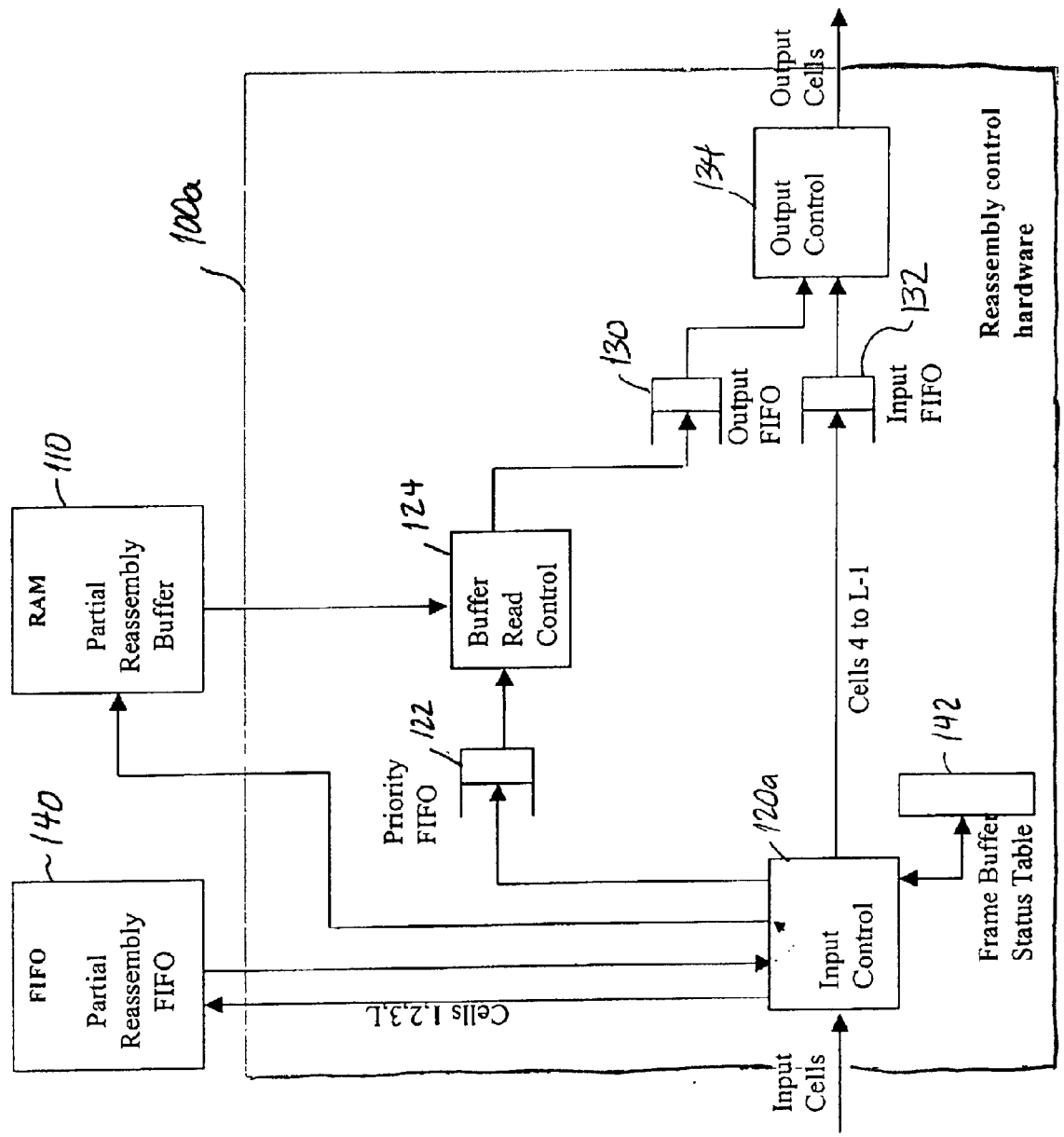
FIG. 8 is a block diagram of a partial reassembly control hardware system according to a second embodiment of the present invention.

FIG. 8 depicts a partial reassembly control system 100a in accordance with a further embodiment of the present invention. As in the above-described system 100 of FIG. 1, an FPGA or ASIC controls an external RAM denoted a partial reassembly buffer 110. In this FIG. 8 embodiment, however, the storage requirements of partial reassembly buffer 110 are reduced and the buffer formatting simplified through the use of a partial reassembly FIFO memory 140

As in the FIG. 1 embodiment, partial reassembly buffer 110 provides temporary storage for the first three cells and the last cell of each frame, with these four cells of each frame contiguously stored. A descriptor is likewise added to each cell increasing the storage requirements from 53 to 64 bytes, and the buffer is allocated in 4 cell blocks or frame buffers. In the embodiment of FIG. 8, however, there is only one frame buffer for each connection in partial reassembly buffer 110. Furthermore, the frame buffer for each particular connection is at a fixed offset location within partial reassembly buffer 110. Accordingly, the size of the partial reassembly buffer for this FIG. 8 embodiment is 4 cells per connector*64 bits per cell*4K connections=1 MB.

In the FIG. 8 embodiment, the worst case traffic scenario and the finite time required for emptying the partial reassembly buffer are accommodated not by enlarging the partial reassembly buffer 110, but by adding the partial reassembly FIFO 140. The first three cells and the last cell of a frame are directed to the partial reassembly buffer 110 via partial reassembly FIFO 140. Cells received at the input controller 120a are first transferred to and stored in partial reassembly FIFO 140. Cells are then read from partial reassembly FIFO 140 and stored in the appropriate frame buffer in partial reassembly buffer 110. If the frame buffer in partial reassembly buffer 110 to which a cell is to be transferred is full, the process pauses until sufficient room is available to store the cell in partial reassembly buffer 110. The system 100a accordingly will not overflow if partial reassembly FIFO 140 is made to be as large as partial reassembly buffer 110, i.e., 1 MB in the present example, even under the worst case traffic conditions where the last cells of frames on each connection arrive sequentially and are followed by a continuous sequence of single cell frames.

A frame buffer status table 142 is connected to input controller 120a and indicates whether the frame buffer in partial reassembly buffer 110 for a current incoming cell is full. Frame buffer status table 142 checks whether the frame buffer for an incoming cell contains the last cell of a frame which is not yet being transferred from partial reassembly buffer 110, and thereby indicates whether the transfer of cells to the partial reassembly buffer should be paused. Frame buffer status table 142 includes one bit for each frame buffer or connection, i.e., 4K bits in the current example. When the last cell of a frame is transferred from partial reassembly FIFO 140 to partial reassembly buffer 110, the status bit for the connection of that frame is set to "full". When the first cell of the partially reassembled frame is transferred from die partial reassembly buffer, the "full" status for that connection in frame buffer status table 142 is cleared.

The priority FIFO memory 122 in the embodiment of FIG. 8 operates as described above in connection with the FIFO memory 122 of the FIG. 1 embodiment, but is only required to be 4K entries deep to match the number of frame buffers in partial reassembly buffer 110.

Figure 9:
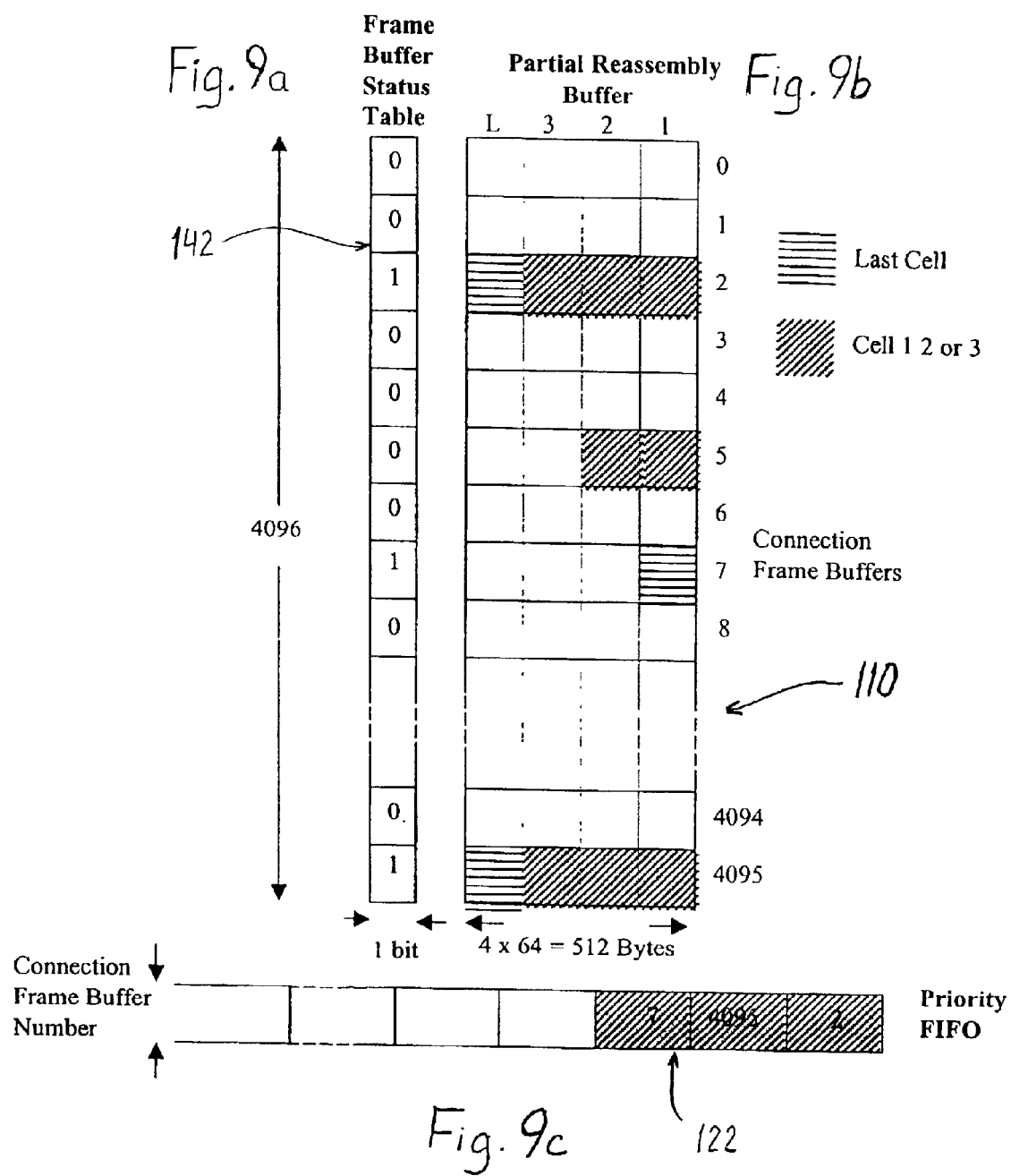
FIG. 9a is a schematic diagram of a frame buffer status table of system of FIG. 8.
FIG. 9b is a schematic diagram of a partial reassembly buffer of the system of FIG. 8.
FIG. 9c is a schematic diagram of a priority FIFO memory buffer of the system of FIG. 8.

FIGS. 9a, 9b and 9c show the frame buffer status table 142, partial reassembly buffer 110, and priority FIFO 122 at a particular instant in time in which the first three cells and the last cell of connection 2 are in frame buffer 2 of partial reassembly buffer 110, the first two cells of connection 5 are in frame buffer 5 of the partial reassembly buffer 10, the last cell of connection 7 is in frame buffer 7, and all cells of connection 4095 have been received at buffer 4095. The last cell in frame buffer 2 was received before the last cell in frame buffer 4095, which was in turn received before the last cell in frame buffer 7.

Figure 10:
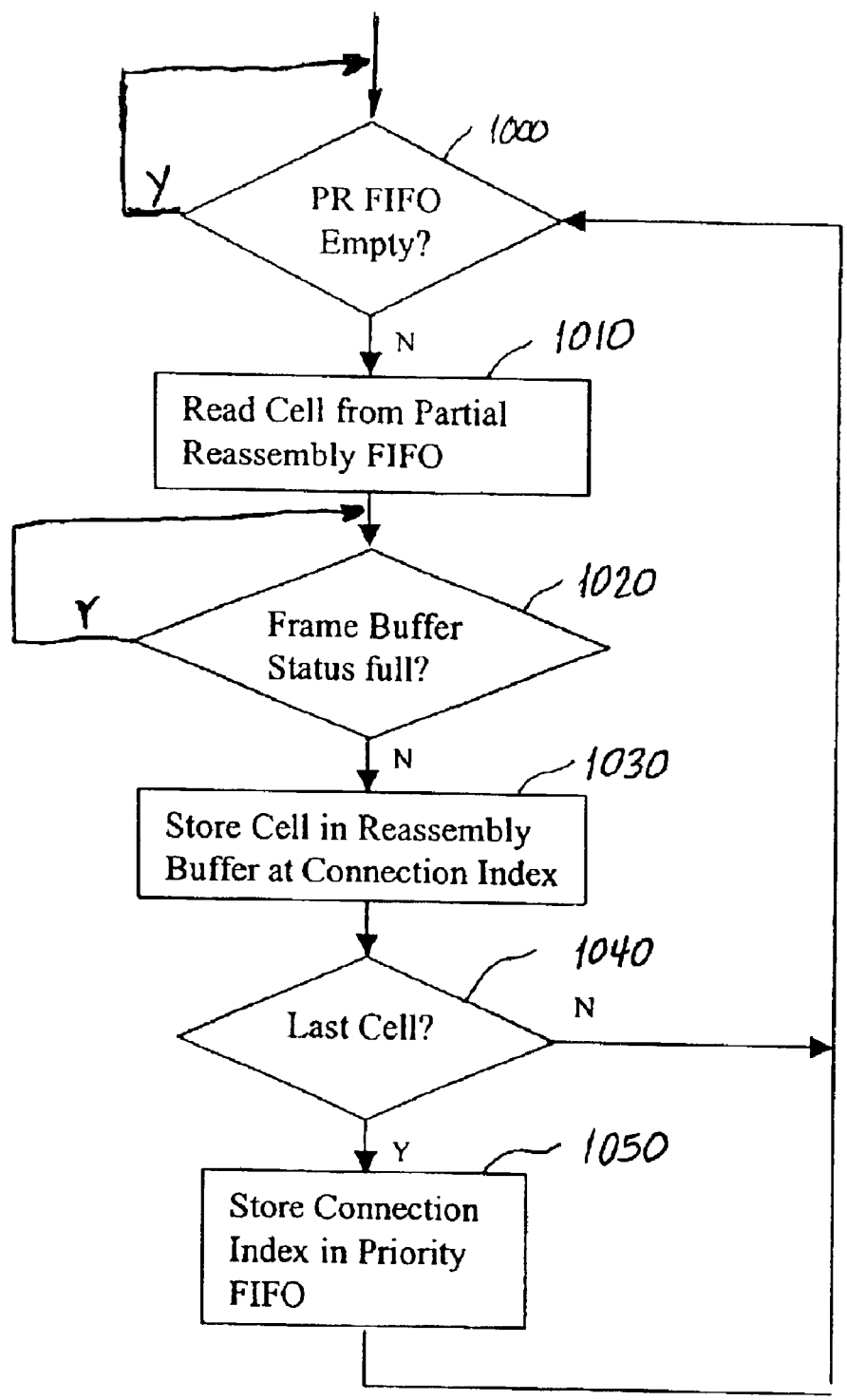
FIG. 10 is a flow diagram depicting a reassembly method using the system of FIG. 8.

Input controller 120a of the FIG. 8 embodiment transfers all cells other than the first three cells and the last cell of a frame to input FIFO memory 132. The first three and last cells are transferred to partial reassembly FIFO memory 140. FIG. 10 shows the procedure for transferring the cells from partial reassembly FIFO memory 140 to partial reassembly buffer 110. At step 1000, the input logic 120a determines whether partial reassembly FIFO memory 140 is empty. If it is not, the cell is read from the partial reassembly FIFO memory 140 and the connection associated with that cell is determined, as for example using a connection index stored in the descriptor of the cell (step 1010). The status of frame buffer status table 142 for the identified connection is checked to determine whether there is room to store the cell in the partial reassembly buffer 110 (step 1020). If it is determined that the frame buffer is full, then the process pauses until there is sufficient space in the partial reassembly buffer 110 to save the cell.

When the status indication in frame buffer status table 142 indicates that the frame buffer is not full, the cell is stored in partial reassembly buffer 110 at the frame buffer location associated with the connection for that cell and at the appropriate cell position, as determined from the descriptor (step 1030). If the cell is found to be the last cell of that frame buffer (step 1040) the pointer for that frame buffer is stored in priority FIFO memory 122 (step 1050) and the process returns to step 1000. If that cell is not the last cell, on the other hand, the process returns directly to step 1000 from step 1040. Input controller 120a is then ready to process the next available cell from partial reassembly FIFO memory 140. This above process may be pipelined to accommodate a continuous flow of cells from partial reassembly FIFO memory 140 to partial reassembly buffer 110 without any loss or diminution of bandwidth.

Figure 11:
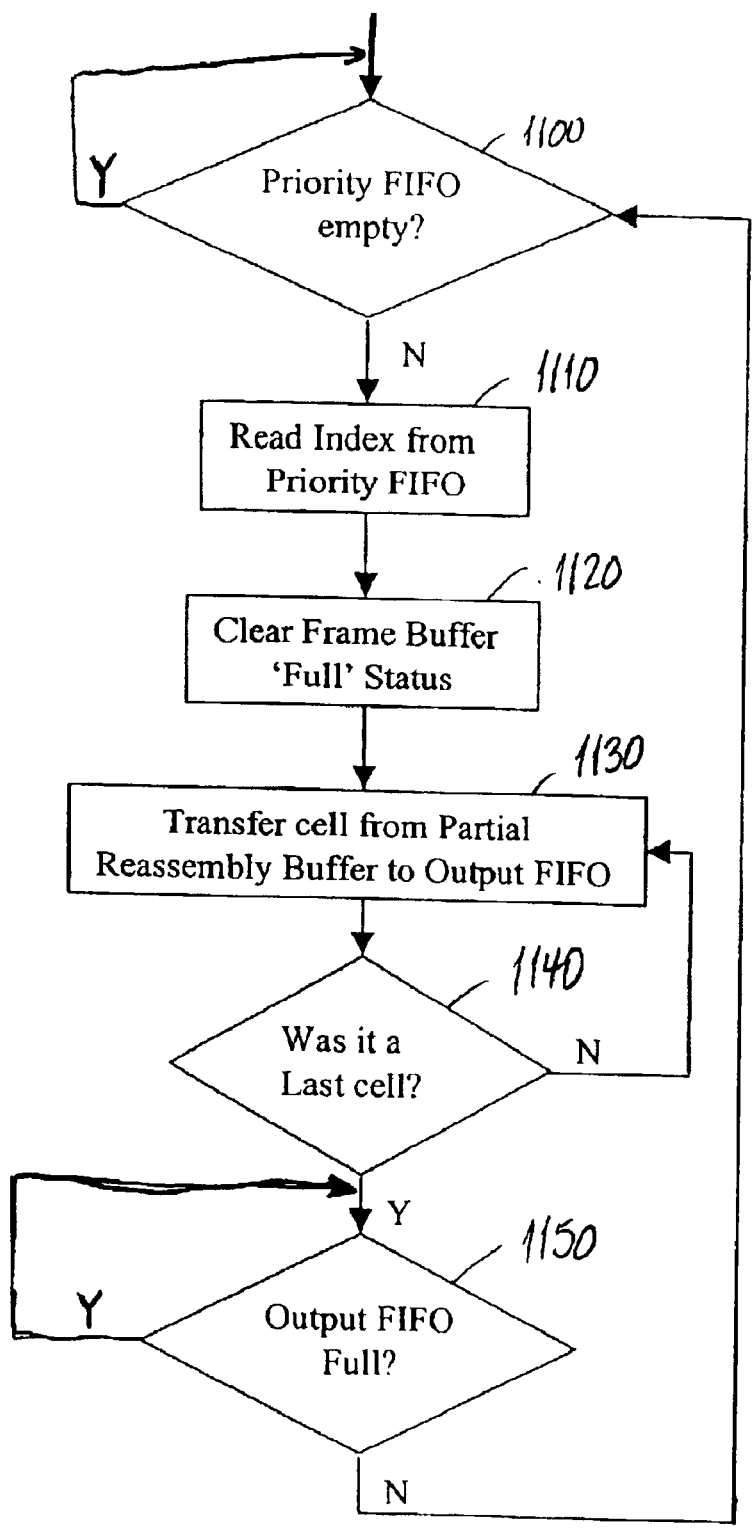
FIG. 11 is a flow diagram for buffer read control in the system of FIG. 8.

The buffer read controller 124 operates as shown in the flow chart of FIG. 11, which is similar to that of FIG. 6. At step 1100, buffer read controller 124 monitors the status of priority FIFO memory 122. If the priority FIFO memory 122 is determined to be not empty, buffer read controller 124 reads the frame buffer pointer of the next partially reassembled frame from priority FIFO memory 122 (step 1110). Since this buffer is thereby about to be freed, the frame buffer full status flag or indication for that frame is cleared (step 1120). The cells of the partially reassembled frame are transferred in sequence from partial reassembly buffer 110 and stored in output FIFO memory 130 (step 1130). Each transferred cell is checked at step 1140 to determine whether it was the last cell of the partially reassembled frame. As noted above, output FIFO memory 130 is a synchronous FIFO large enough to hold four cells. If output controller 134 has not yet commenced to empty output FIFO memory 130 and is currently full, then buffer read controller 124 pauses before repeating this process.

Output controller 134 monitors input FIFO 132 and output FIFO 130 and operates as described above with reference to FIGS. 1 and FIG. 7.

A network analyzer that includes the above-described reassembly control arrangement of the invention may further benefit from or require payload filtering in which at least a portion of each frame of data is compared against a template or filter criterion and discarded if it fails to match so that the capture buffer of the network analyzer will contain only potentially useful data. The payload filtering process narrows the focus of the analysis to certain types of data defined by the frame header, which is encapsulated in the first three cells of the frame. The filtering process criterion is limited to the reassembled header, but the filter action is applied to the full frame. The partial reassembly process delays it's the analyzers operations on each frame until the cells containing the frame header have been received and processed by the payload filter. The filter result can be applied to all data flows, i.e., RMON, expert analysis, capture, or a subset of these; that is, the data requirements of each of these functions may be different so that different filter templates may be used in connection with these different functions. Separate payload filters and separate results could be used for each data flow or a single filter comparison and single result call be used or ignored by the individual dataflows.

Figure 12:
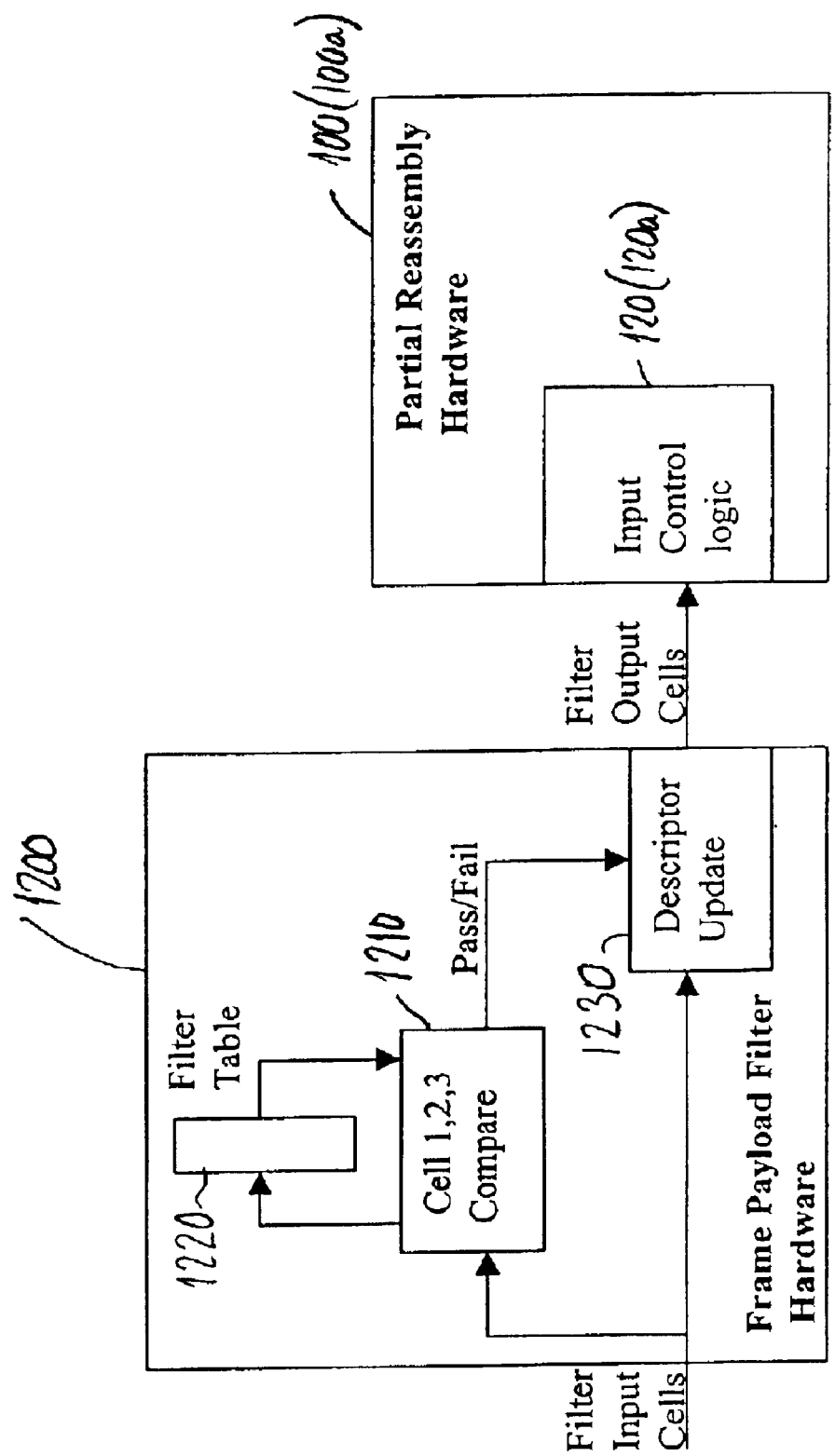
FIG. 12 is a block diagram of frame payload filter hardware for use with the systems of FIGS. 1 and 8.

As shown in FIG. 12, the filter comparison is effected upstream of the partial reassembly process. The frame payload filter apparatus 1200 includes a comparator 1210, a filler table 1220, and a descriptor update 1230. The comparison is performed individually on each cell with the partial filter result stored in filter result table 1220, which includes one bit per connection. This result is retrieved at the beginning of the subsequent comparisons of the second and third cells of the frame so that a cumulative result may be calculated. After the third cell comparison, the result in the filter result table defines the final result for that frame and, based thereon, the descriptors for the third and subsequent cells of that frame are marked either pass or fail for the downstream logic. As noted above, different filter templates may be used to filter the data required for each of the different functions, i.e., RMON, expert analysis, and capture, with the result of each filter operation being stored in the cell descriptors.

Input controller 120, 120*a* of the partial reassembly apparatus 100, 100*a* is enhanced to support filtering. The input controller 120, 120*a* determines whether cells that are not the first three cells or the last cell have descriptors marked as failed. Those cells with descriptors marked failed are not saved to input FIFO 132, i.e., they are discarded. Note, it is assumed here that Capture is the only dataflow that uses cells 4 to the penultimate cell. However if this is not the case and the filter parameters are different for the different dataflows then these 'middle' cells may be stored to the input FIFO as normal and the individual dataflows may then use the filter result of the descriptors to ignore or process the cells appropriately.

In the FIG. 1 embodiment, filtering of the first three and last cells may be carried out as follows: when the last cell received includes a descriptor marked "failed", input controller 120 stores the frame buffer pointer from the current frame table into the next free buffer FIFO instead of the priority FIFO, thereby freeing up the frame buffer and ensuring that none of the cells of the frames are passed to the downstream logic.

In the FIG. 8 embodiment, filtering of the first three and last cells may be carried out as follows: when the last cell received includes a descriptor marked "failed", input controller 120*a* does not set the 'Full' bit in the frame status table or put the frame buffer pointer in the priority FIFO, thereby allowing the frame buffer to be reused and ensuring that none of the cells of the frames are passed to the downstream logic.

Input controller 120, 120*a* could alternatively operate in its normal manner for these cells in both the FIG. 1 and FIG. 8 embodiments. However, only the third cell and the last cell are guaranteed to have their descriptors marked failed. Pipelininig must therefore be employed for updating the descriptors of the first two cells with the filtering result of the third cell before the first three and the last cells of the frame are transferred to the partial reassembly control apparatus 100, 100*a*. The downstream logic can then inspect the descriptor of each cell to allow for filtered or unfiltered analysis. This allows separate filter actions for the different flows.

Capture of the data in a network analyzer involves dynamic storing of the link data to a capture buffer (e.g., RAM) at full link-rate. Data capture may stop when the capture buffer is full or a wrap mode in which the buffer will contain the latest data on the link may be employed. In either mode, the capture may be manually halted or may utilize triggers to allow interruption of the data capture at any given instant in time. The capture buffer is viewed post-capture, and this process is therefore not as performance critical. It may, however, be necessary to view the buffer in two separate formats: fully reassembled frame format and cell link order.

Figure 13:
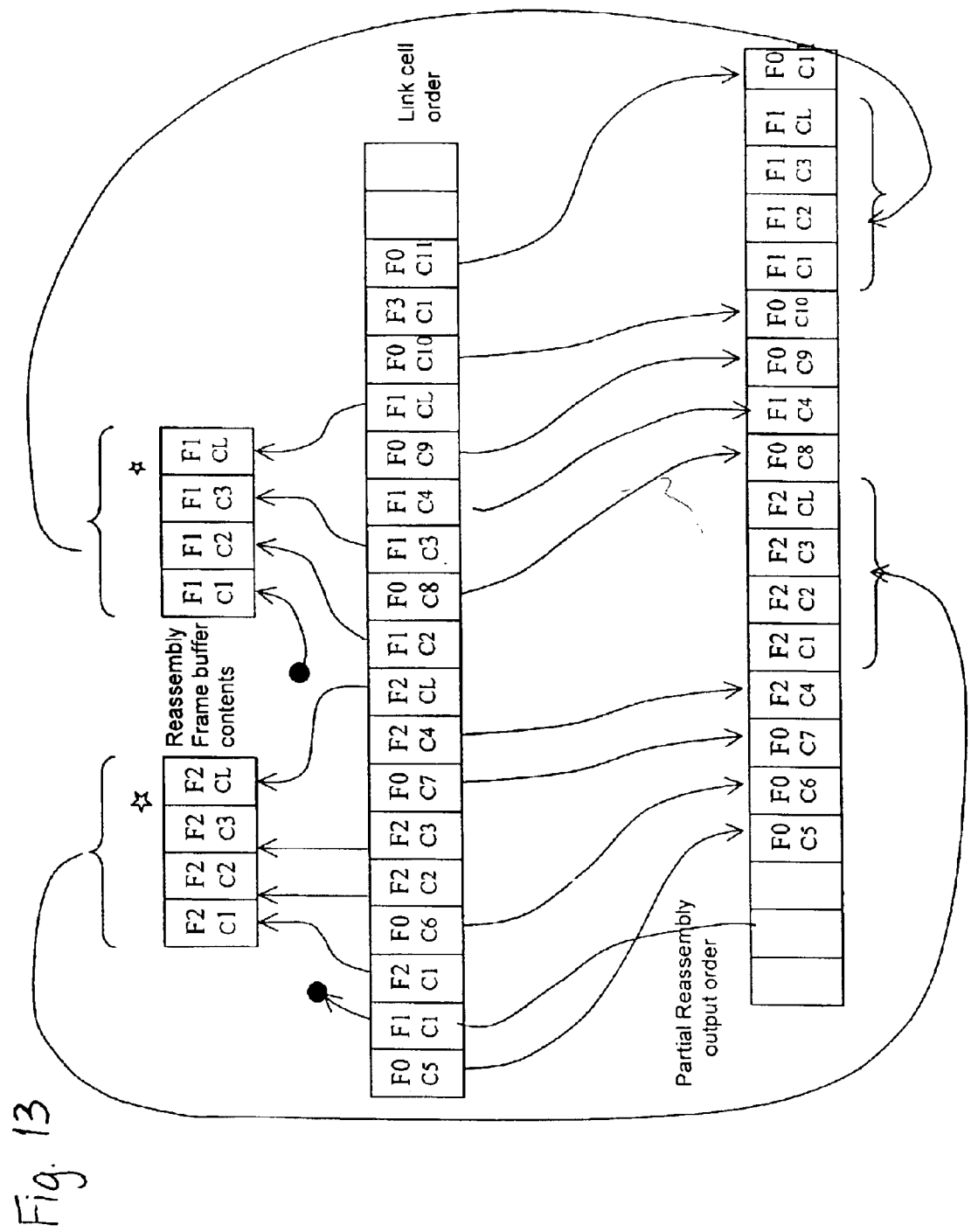
FIG. 13 is a schematic diagram showing the cell order of cells received by the inventive system after partial reassembly in accordance with the present invention.

As shown in FIG. 13, data is stored in the capture buffer in the order in which it is received from the partial reassembly hardware 100, 100*a*. Cells that are not the first three or last cells of a frame, i.e., cells four through the penultimate cell of a frame, are stored in timestamp order. The partially reassembled frame segments are stored in contiguous blocks in last cell timestamp order, but later in the capture buffer than the middle cells of the same frame. The contiguous blocks of the partially reassembled frame segments are blocks of four cells for frames having four or more cells. If the frames are shorter than four cells, the contiguous blocks of the partially reassembled frame segments comprise the complete frames. To assist in reordering of the cells, the descriptor stored with each cell may contain a field which identifies the cell as 1, 2, 3, 4, or a last cell. In addition, the descriptor may contain a timestamp added in the dataflow prior to partial reassembly, thus reflecting the order in which the cells are received from the link.

The contents of the capture buffer may be transferred to a system memory of a host PC and there sorted for viewing. This transfer may be effected using a DMA controller forming a part of the network analyzer control logic. In a preferred embodiment, the DMA controller includes hardware filtering such as that disclosed in commonly-owned U.S. patent application Ser. No. 10/209,572, entitled "Directed Memory Access Controller and Process for Filtering Data During a Data Transfer", filed concurrently herewith. The DMA hardware and method disclosed therein may be utilized in a network analyzer in conjunction with the reassembly apparatus of the present invention to advantageously optimize performance of the inventive buffer reordering process.

A variety of software and/or hardware may be used to fully reassemble frames from the capture buffer into the system memory, facilitated by the enhanced DMA controller and/or process disclosed by the above-mentioned concurrently pending patent application, which is expressly incorporated herein by reference. A small buffer section is normally reassembled and viewed at one time; the following presents by way of example one algorithm that may be used for that purpose.

Using an enhanced DMA process including a filter, the end-of-frame (i.e., last) cells are transferred to system memory for the number of frames to be transferred from the capture buffer. The length of each frame may then be extracted and frame buffers allocated in system memory so that the end-of-frame cells may be moved to the frame buffers. Using a similar DMA process, the addresses of the end-of-frame cells in system memory are transferred to the capture buffer. The destination addresses in system memory for each of the first four cells of each frame are then calculated and each of those first four cells of each frame are transferred from the capture buffer to the calculated address in system memory. The DMA process is then executed, moving backward through the capture buffer to locate and identify the middle cells of each frame. During this step, filtering is performed by matching the VPI/VCI and timestamp range of each frame and the addresses of matched cells are returned until all of the cells of each frame have been identified, as indicated by the extracted frame length. The DMA process is then executed to transfer the full frames to the respective frame buffers in the system memory, starting from the last address returned in matching of the VPI/VCI.

To view the contents of the capture buffer in link cell order, each cell of the partially reassembled frames must be moved back to its original cell slot which is defined by the timestamp in the descriptor. The middle cells of all frames are already stored in link cell order. A filtered DMA search with "greater than" and "less than" comparisons of the timestamps may be used to generate lists of pointers to cells within appropriate timestamp ranges. DMA processes may then be used to recover data and to perform a software sort as desired or required.

The present invention thus provides two distinct scaleable partial reassembly methods for reassembling interleaved data packets from a dynamic data stream in an ATM architecture without data overflow and at full link-rates. The partial reassembly control process and system of the present invention may advantageously be used in an ATM protocol analyzer to support full line rate capture of payload filtered data. Furthermore, the inventive partial reassembly control methods and system provide a full line rate reassembled frame feed for ATM RMON and expert analysis that may be filtered as required and that provides a shared use of RAM implementation for two related FIFOs of the apparatus.

The invention accordingly implements scaleable partial reassembly for ATM without overflow of data, that requires reduced memory for reassembly as compared to the prior art, that provides a full line rate reassembled frame feed for ATM RMON and expert analysis, and that affords a full line rate capture with frame-based payload filtering.

Partial reassembly methods and apparatus in accordance with the present invention may be easily scaled to support a wider numerical range of concurrent connections. In addition, those skilled in the art will understand and appreciate that the portion of the frame that is reassembled may be increased or decreased as necessary to expand or contract the depth of the payload filtering to meet particular applications or system architecture or other requirements, as a general matter of design choice. An increase in the size of the reassembled frame portion will, as should be apparent, also require an increase in the width of the frame buffers in the partial reassembly buffer and in the depth of the Input and Output FIFOs.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A reassembly control system for partial reassembly of portions of data frames using cells of the data frames received from a data network and for outputting partially reassembled frames to downstream logic, wherein the data network supports a plurality of concurrent connections and each of the data frames is associated with one of the plural connections, said reassembly control system comprising:

a partial reassembly buffer comprising a random access memory and logically divided into a plurality of frame buffers, each sized for receiving the portion of each data frame to be partially reassembled;

an input controller for receiving the cells of the data frames from the data network; and an output controller for outputting to a capture buffer the cells received by said input controller, wherein said input controller comprises means for determining, for each received cell, whether the each cell is in the portion of the data frame to be partially reassembled, means for transferring to said partial reassembly buffer the received cells that are determined to be in the portion of the data frame to be partially reassembled and for transferring to said output controller the received cells not determined to be in the portion of the data frame to be partially reassembled, and means for storing the transferred cells of each data frame as a contiguous block in a corresponding one of the plural frame buffers.

2. The system of claim 1, wherein said output controller is operable to output to the downstream logic the partially reassembled portion of each data frame as a contiguous block and to Output to the downstream logic the other cells of each data frame that are not in the reassembled portion in an order in which the other cells are received by the input controller.

3. The system of claim 1, wherein said partial reassembly buffer includes one frame buffer for each of the plurality of concurrent connections supported by the data network.

4. The system of claim 1, wherein said partial reassembly buffer includes at least two frame buffers for each of the plurality of concurrent connections supported by the data network.

5. The system of claim 1, wherein said partial reassembly buffer includes three frame buffers for each of the plurality of concurrent connection supported by the data network.

6. The system of claim 1, wherein said partial reassembly buffer comprises a dual ported static random access memory.

7. The system of claim 1, wherein said partial reassembly buffer comprises a synchronous dynamic random access memory.

8. The system of claim 1, further comprising a current frame pointer table comprising a pointer to a frame buffer address for each data frame having a cell stored in said partial reassembly buffer.

9. The system of claim 8, wherein said current frame pointer table is connected to said input controller for receiving a pointer for each data frame when a first cell of the data frame is received by the input controller, wherein said printer indicates a particular frame buffer of said partial reassembly buffer in which said first cell of the data frame is to be stored.

10. The system of claim 1, further comprising a next free buffer memory connected to said input controller, and comprising a list of empty frame buffers in the partial reassembly buffer.

11. The system of claim 10, wherein said next free buffer memory comprises a first-in-first-out memory.

12. The system of claim 10, wherein said next free buffer memory comprises a synchronous first-in-first-out memory.

13. The system of claim 10, further comprising a priority memory connected to said input controller, and comprising a list of pointers to frame buffer addresses containing partially reassembled frames for which a last cell of the partially reassembled frame has been received.

14. The system of claim 13, wherein said priority memory comprises a first-in-first-out memory.

15. The system of claim 14, wherein said priority memory comprises a synchronous first-in-first-out memory.

16. The system of claim 13, wherein both said priority memory and said next free buffer memory are contained in a single shared random access memory.

17. The system of claim 16, wherein each of said priority memory and said next free buffer memory comprises a first-in-first-out memory.

18. The system of claim 1, further comprising a priority memory connected to said input controller, and comprising a list of pointers to frame buffer addresses containing partially reassembled data frames for which a last cell of the partially reassembled data frame has been received.

19. The system of claim 18, wherein said priority memory comprises a first-in-first-out memory.

20. The system of claim 19, wherein said priority memory comprises a synchronous first-in-first-out memory.

21. The system of claim 18, further comprising a buffer read controller connected to said partial reassembly buffer and to said priority memory, said buffer read controller being operatively arranged for reading from the priority memory one of the pointers that indicates the next partially reassembled data frame to be transferred from the partial reassembly buffer to the capture buffer.

22. The system of claim 21, further comprising an input memory for receiving, from the input controller, cells that are not in the portion of a data frame to be reassembled and an output memory for receiving, from the buffer read controller, the partially reassembled frames output from the partial reassembly buffer, wherein said output controller is connected to said input memory and to said output memory for transferring data from the input memory and the output memory to the capture buffer.

23. The system of claim 22, wherein said output controller is operatively arranged for transferring data from said input memory before transferring data from said output memory.

24. The system of claim 1, further comprising a partial reassembly FIFO memory connected to said input controller, wherein said means for transferring the received cells that are determined to be in the portion of a data frame to be partially reassembled comprises means for transferring the received cells in the portion of the frame to be partially reassembled to said partial reassembly FIFO memory and means for transferring the transferred cells in said partial reassembly FIFO memory to said partial reassembly buffer.

25. The system of claim 24, wherein said means for transferring the received cells from said partial reassembly FIFO memory to said partial reassembly buffer comprises means for determining, for each cell to be transferred, a one of the plural connections to which the cell applies.

26. The system of claim 25, further comprising means for pausing the transfer of cells from said partial reassembly FIFO memory to the partial reassembly buffer if a frame buffer for the determined one connection of the cell is full.

27. The system of claim 24, wherein said partial reassembly buffer includes one frame buffer for each of the plural connections supported by the data network.

28. The system of claim 27, further comprising a frame buffer status table which indicates a full status for each frame buffer which has received a last cell of the data frame and is not currently being emptied.

29. The system of claim 28, further comprising means for pausing the transfer of cells from said partial reassembly FIFO memory to said partial reassembly buffer if said frame buffer status table indicates a full status for the frame buffer of the cell to be transferred.

30. The system of claim 1, further comprising a frame payload filter disposed upstream of said input controller and comprising a comparator for comparing data in frame header cells of each data frame to filter criteria to define a filter result and a descriptor updater for marking a descriptor of each cell with the filter result.

31. The system of claim 30, wherein said input controller comprises means for reading the filter result for each cell and discarding the cell if tie filter result indicates that the cell does not match the filter criteria.

32. The system of claim 30, wherein the frame header of each data frame is contained within the first three cells of said each data frame, and wherein said descriptor updater includes means for pipelining transfer of cells from the frame payload filter to the input controller such that the filter result for a cell is available before the cell is transferred from the frame payload filter to said input controller.

33. The system of claim 1, wherein said means for transferring to said output controller the received cells not determined to be in the portion of the data frame to be partially reassembled includes means for determining whether the received cells not determined to be in the portion of the data frame to be partially reassembled are required by the downstream logic and discarding those received cells not determined to be in the portion of the data frame to be partially reassembled that are not required by the downstream logic.

34. The system of claim 1, wherein said reassembly control system comprises a portion of a network analyzer.

35. The system of claim 34, wherein the data network is an ATM network.

36. A method of partially reassembling portions of data frames from cells of the data frames received from a data network and outputting partially reassembled frames to downstream logic, said method using a reassembly control system that includes an input controller, a partial reassembly buffer and an output controller, and wherein the data network supports a plurality of concurrent connections and each of the plural data frames is associated with one of the plural concurrent connections, said method comprising the steps of:

(a) receiving at the input controller cells of the data frames from the data network;

(b) determining, for each cell received in said step (a), whether the cell comprises a data frame portion that is to be reassembled;

(c) transferring each cell that is not determined in said step (b) to comprise a data frame portion to be reassembled, defined as an other cell, from the input controller to the output controller; and (d) transferring each cell that is determined in said step (b) to comprise a data frame portion to be reassembled from the input controller to the partial reassembly buffer and storing the transferred cells of each data frame as a contiguous block defining a partially reassembled frame.

37. The method of claim 36, wherein said step (b) comprises determining, for each cell received in said step (a) whether the cell is one of a header cell and a last cell of a data frame.

38. The method of claim 36, further comprising the steps of:

(e) transferring each partially reassembled frame from the partial reassembly buffer to the output controller; and (f) transferring to the capture buffer, by the output controller, the each partially reassembled frame as a contiguous block of cells and outputting the other cells of each data frame to the capture buffer in an order in which the other cells are received by the input controller.

39. The method of claim 38, wherein reassembly control system further includes an input memory connected to the output controller and an output memory connected to the output controller, wherein said step (c) comprises transferring each other cell to the input memory, and wherein said step (e) comprises transferring the partially reassembled portions of the data frames from the partial reassembly buffer to the output memory.

40. The method of claim 39, wherein said step (f) further comprises the steps of determining, by the output controller, whether the input memory is empty;

transferring cells from the input memory to the capture buffer if the output controller determines that the input memory is not empty;

determining, by the output controller if it is determined that the input memory is empty, whether the output memory is empty; and transferring an entire partially reassembled data frame from the output memory to the capture buffer if it is determined that the output memory is not empty.

41. The method of claim 40, wherein said step (f) further comprises the step of transferring an idle cell to the capture buffer if it is determined that the output memory is empty.

42. The method of claim 38, further comprising the step of determining, for each cell stored in the partial reassembly buffer in said step (d), whether the stored cell is a last cell of a data frame and performing said step (e) of transferring the partially reassembled portion of the data frame of the stored cell if it is determined that the stored cell is the last cell.

43. The method of claim 42, wherein the reassembly control system further includes a priority memory and a buffer read controller connected to the priority memory and to the partial reassembly buffer, wherein said step (d) further comprises storing a current frame pointer in the priority memory if it is determined that the cell stored in the partial reassembly buffer in said step (d) is a last cell, and wherein said step (e) comprises determining whether said priority memory is empty, reading by the buffer read controller the frame pointer from the priority memory if it is determined that the priority memory is not empty, and transferring to the output controller cells from the frame buffer at an address indicated by the Frame pointer until the last cell of the data frame has been transferred.

44. The method of claim 38, further comprising the step of fully reassembling the data frames from the capture buffer in a system memory.

45. The method of claim 38, further comprising the step of reassembling the cells from the capture buffer into a link cell order in a system memory.

46. The method of claim 36, wherein the partial reassembly buffer is logically divided into plural frame buffers configured for holding the cells of one frame to be partially reassembled, and wherein said step (d) further comprises the steps of:

determining, for each cell, whether the cell is a first cell of a frame; and storing the determined cell in an empty one of the frame buffers in the partial reassembly buffer if it is determined that the cell is a first cell of a frame.

47. The method of claim 46, wherein the reassembly control system further includes a current frame pointer table including pointers associating each data frame in the partial reassembly buffer with a corresponding one of the plural frame buffers, and wherein said step (d) further comprises updating the current frame pointer table to include a pointer to the corresponding flame buffer in which the first cell of the data frame is stored.

48. The method of claim 46, wherein the reassembly control system further includes a current frame pointer table including pointers associating each frame of data in the partial reassembly buffer with a corresponding one of the plural frame buffers, and wherein said step (d) further comprises reading a pointer address from the current frame pointer table for the each data frame of the cell if it is determined that the cell is not a first cell of the each data frame and storing the determined cell in the corresponding, frame buffer at the pointer address read from the current frame pointer table.

49. The method of claim 36, wherein the reassembly control system further includes a partial reassembly FIFO memory, and wherein said step (d) comprises transferring to the partial reassembly FIFO memory each cell that is determined in said step (b) to comprise a portion of a data frame to be reassembled and transferring to the partial reassembly buffer the transferred cells from the partial reassembly FIFO memory.

50. The method of claim 49, wherein the reassembly control system further includes a frame buffer status memory indicating, for each frame buffer in the partial reassembly buffed, whether a last cell of a data frame has been received in that frame buffer, and wherein said step of transferring cells from the partial reassembly FIFO memory to the partial reassembly buffer includes determining, for each cell transferred, whether the transferred cell is the last cell of a data frame and updating the frame status buffer memory to indicate a full status for that frame buffer if it is determined that the cell is the last cell of a data frame.

51. The method of claim 48, wherein the reassembly control system further includes a frame buffer status memory indicating, for each frame buffer in the partial reassembly buffer, whether a last cell of a data frame has been received in that frame buffer and has not yet been transferred from the partial reassembly buffer, and wherein said step of transferring cells from the partial reassembly FIFO memory to the partial reassembly buffer comprises pausing the transfer of cells from the partial reassembly FIFO memory to the partial reassembly buffer when a next cell to be transferred is associated with a frame buffer for which the frame buffer status memory indicates is a full status.

52. The method of claim 36, wherein each data frame comprises a header in at least one header cell, and wherein said method further comprises the step, prior to said step (a), of comparing header cells of the data frames to filter criteria to define comparison results and discarding cells which do not meet the filter criteria.

53. The method of claim 52, wherein each of said data frames comprises more than one header cell, and wherein said step of comparing comprises saving the comparison results for the first header cells of a data frame until all cells of the data frame have been received.

54. The method of claim 53, wherein a descriptor of each cell is updated after the step of comparing to indicate whether the filter criteria are passed or failed.

* * * * *